F. HANSEN.
VEHICLE BODY.
APPLICATION FILED AUG. 25, 1917.
1,262,485.
Patented Apr. 9, 1918.
2 SHEETS—SHEET 2.
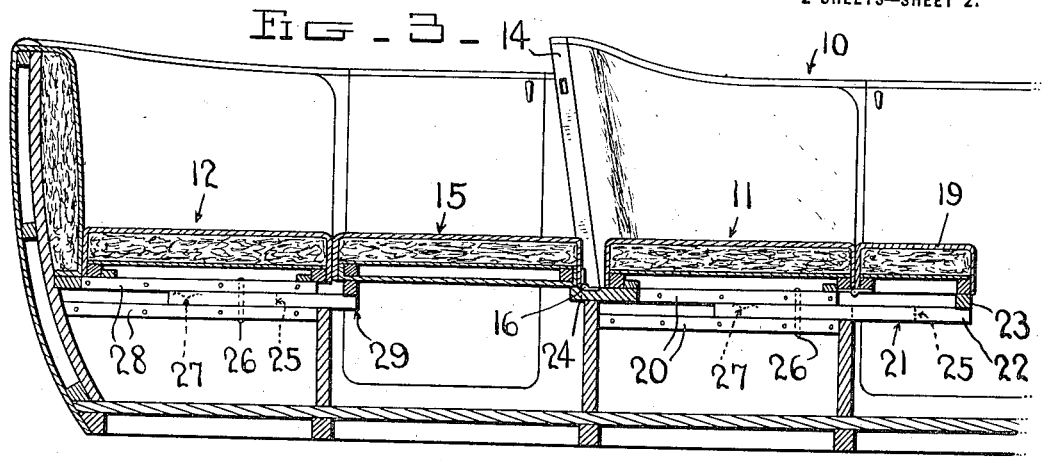
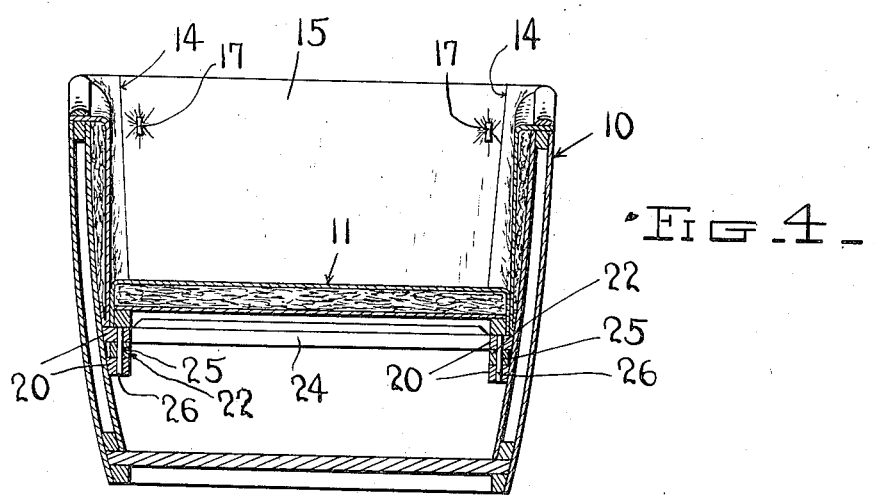
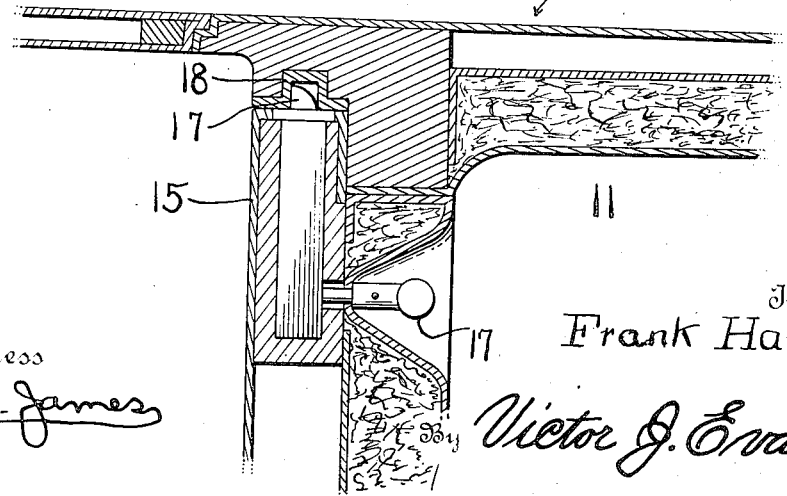
Inventor
Frank Hansen
By Victor J. Evans
Attorney
Witness
L. B. James

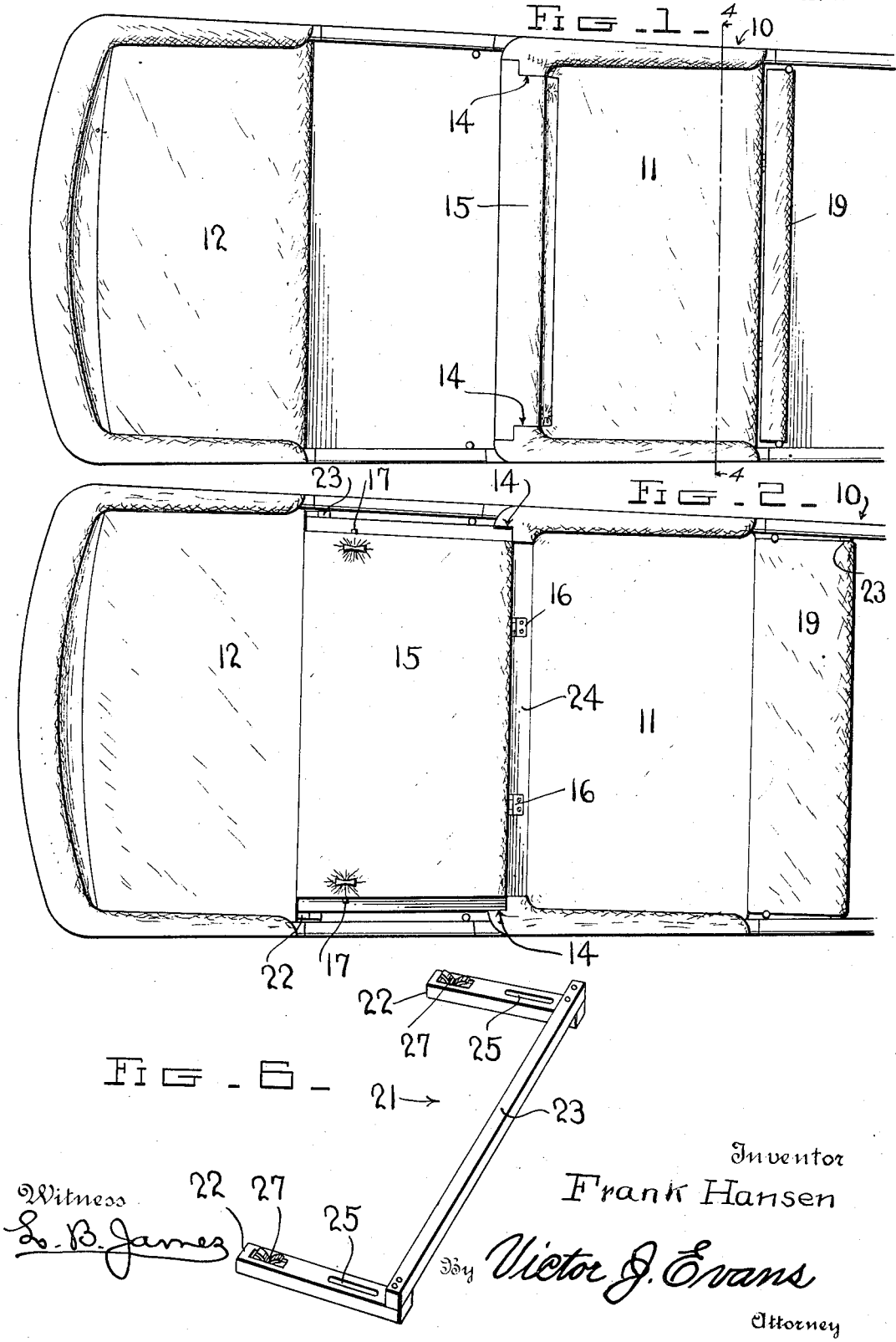

UNITED STATES PATENT OFFICE.

FRANK HANSEN, OF BRESLAU, NEBRASKA.

VEHICLE-BODY.

1,262,485.

Specification of Letters Patent.  Patented Apr. 9, 1918.

Application filed August 25, 1917. Serial No. 188,164.

*To all whom it may concern:*

Be it known that I, FRANK HANSEN, a citizen of the United States, residing at Breslau, in the county of Pierce and State of Nebraska, have invented new and useful Improvements in Vehicle-Bodies, of which the following is a specification.

This invention relates to vehicle bodies and more particularly to that class of vehicle bodies adapted for use in motor vehicles or automobiles for touring and camping purposes, and has for its object to produce a vehicle body of this class which may be easily converted into a bed.

A further object of the invention is the provision in a vehicle body having its front seat, at its outer edge provided with a hinged apron and its back provided with a hinged member or panel, slidable means, normally arranged beneath the front and back seats designed when drawn outwardly to effectively support the apron and panel in a horizontal position in a line with the front and back seats, thereby converting the seats into a bed.

It is a still further object of the invention to produce a convertible bed for automobile bodies which shall be inexpensive and readily applied to any ordinary construction of such bodies.

Other objects and advantages will appear as the nature of the invention is more fully understood, reference being had to the accompanying drawings, in which;

Figure 1 is a top plan view of a vehicle body constructed in accordance with the present invention.

Fig. 2 is a similar view but showing the body converted into a bed.

Fig. 3 is an approximately vertical longitudinal sectional view through the device illustrated in Fig. 2.

Fig. 4 is a vertically transverse sectional view approximately on the line 4—4 of Fig. 1.

Fig. 5 is an enlarged detail sectional view taken in a line with one of the catch members which secures the hinged back to the sides of the front seat when the back is in its upright position.

Fig. 6 is a perspective view of one of the members employed for supporting either the apron or the hinged back for the front seat.

The body 10 is of any desired size, shape and construction, but being of the class employed on "touring" cars.

Arranged within the body 10 is the usual front seat 11 and the usual back seat 12, the front seat having its sides at the rear edges thereof, channeled or mortised throughout the length of the said edges as indicated by the numerals 14, whereby to receive therein the edges of the back 15, the said back being hinged, as at 16, to the rear of the seat 11. The sides of the hinged back, at the edges thereof, are provided with spring catch members 17, the bolts of which are designed to be received in suitable keepers 18 in the sides 13, whereby the back may be rigidly secured to the sides.

Preferably, but not necessarily, the front seat 11 is provided with a depending apron 19, the frame of the same being hingedly secured to the outer edge of the said seat.

The sides below the cushions of the front seat 11, or in what is commonly termed the box of the seat are provided with horizontally disposed spaced cleats 20—20, the said cleats providing guides or slots for a slidable support 21. By reference to Fig. 6 of the drawings, it will be noted that the slot comprises two parallel members 22—22 and the outer connecting member 23. The front of the seat, at what I have termed the box portion thereof, is grooved or channeled to receive the connecting member 23 of the sides, and the cushion of the front seat is supported upon the upper cleats 20 and, if desired, upon a rear cleat 24. The side or parallel members of the slidable support 21 are preferably provided with elongated slots 25, and secured to the cleats 20 and passing through the said slots are stop members 26, whereby to limit the outward sliding of the support 21, and also, if desired, suitable spring members 27 may be arranged between the sides of the support and the upper cleats 20, the said springs serving as frictional elements for preventing the accidental sliding of the said support and for effectively holding the said supports in their outward position when the member 21 is drawn outwardly to support the apron 19, it being, of course, understood that the apron is swung upwardly upon its hinged connection with the front seat but the member 21 is drawn outwardly of the box of the said front seat.

The rear or back seat 12, below the cushion thereof has transverse spaced cleats arranged in pairs which are designated by the numerals 28 and the upper cleats may provide the support for the cushion of the back seat. These cleats provide ways for a slidable support 29 of a precisely similar construction to the support 21, the same means being provided for limiting the outward movement of the support 29 and the same spring means being provided for causing the said support to frictionally engage with the cleats 28 to effectively retain the same in both its inner and outer positions.

It will be apparent that by actuating the catch members 17, the hinged back 15 of the front seat 11 may be swung parallel with the cushion of the rear seat 12, it being understood, of course, that the support 29 has been previously drawn outwardly so as to sustain the said back in its horizontal position. It will be further apparent that by simply swinging the back 15 against the sides, the spring actuated catch members 17 will readily engage with their keepers 18 and thus hold the back effectively upon the side, and by moving the slides inwardly of the respective seats, the apron of the front seat may be brought to assume a vertical position, and from the foregoing description, when taken in connection with the accompanying drawings, the simplicity of the construction and the advantages thereof, will be apparent without further detailed description.

Having thus described my invention, what I claim is:

In a means for supporting a hinged member in a vertical position or in a line with the element to which the said member is hingedly connected, including spaced cleats beneath the stationary member, a substantially U-shaped slide having its parallel members received between the cleats, slots in said parallel members, an element between the cleats engaging in said slots, and spring means between said parallel members and said cleats for exerting tension between said members and cleats.

In testimony whereof I affix my signature.

FRANK HANSEN.